United States Patent Office 3,303,174
Patented Feb. 7, 1967

3,303,174
RADIATION POLYMERIZATION PROCESS AND PRODUCTS THEREOF
Raymond Lanthier, Shawinigan, Quebec, Canada, assignor to Shawinigan Chemicals Limited, Montreal, Quebec, Canada, a corporation of Canada
No Drawing. Filed Aug. 4, 1960, Ser. No. 47,393
11 Claims. (Cl. 260—89.1)

This invention relates to the polymerization of vinyl acetate. More particularly, it relates to the radiation polymerization of vinyl acetate and to the production therefrom of extremely high viscosity polyvinyl alcohol.

Hydrolyzed polyvinyl acetates, prepared by hydrolysis or alcoholysis and hereinafter referred to as polyvinyl alcohols, are useful for many purposes. Polyvinyl alcohols of especially high viscosity are needed for some uses, e.g. as thickening agents, protective colloids, and the like, in which high viscosity solutions having low solid content are desired.

It is well known that, when conventional high molecular weight polyvinyl acetate is hydrolyzed and reacetylated, chain ruptures, which occur during the hydrolysis or alcoholysis, cause the reacetylated product to have a lower viscosity than the original polyvinyl acetate. After one such hydrolysis or alcoholysis, the polymer is substantially stable against further degradation on subsequent hydrolysis or alcoholysis. As the viscosity of polyvinyl alcohol varies in the same direction as the viscosity of reacetylated polyvinyl acetate, the upper limit of viscosity of the polyvinyl alcohols commercially available is set at a very low level by this degradation behavior. Chemically homogeneous vinyl acetate polymers having an intrinsic viscosity, when hydrolyzed and reacetylated, of 1.7 dl./g. or more, have not been disclosed in the art, nor has any method for their preparation been disclosed or suggested. Thus, the highest intrinsic viscosity obtainable from commercially available chemically homogeneous polyvinyl alcohol is 1.6 dl./g. for the reacetylated product of a grade of polyvinyl alcohol sold commercially under the trademark Gelvatol 1:90.

High viscosity polyvinyl alcohol is conventionally produced by special chemical techniques such as the introduction of chemically heterogeneous cross-links, e.g. sulfate links, in the polymer. This method has several serious drawbacks. The heterogeneous cross-links render the product colored and unstable to prolonged heating. Furthermore, the product contains impurities such as side reaction products and initiator residues.

It is an object of this invention to produce very high molecular weight polyvinyl acetate which is completely soluble in the usual solvents, e.g. acetone, in conversions of at least 80%. It is another object of this invention to produce very high viscosity polyvinyl alcohol by alcoholysis of said polyvinyl acetate.

It has now been found that polyvinyl alcohol of very high viscosity can be produced at very high conversions of vinyl acetate by small doses of radiation in aqueous emulsion in presence of an emulsifying agent, followed by alcoholysis of the polymer thus formed, the process being conducted under specific conditions defined hereinafter.

The present invention thus consists of a process for preparing a very high molecular weight polyvinyl acetate, said process comprising (A) emulsifying vinyl acetate in water by agitation in presence of an emulsifying agent stable to ionizing radiation, (B) irradiating said emulsified vinyl acetate in absence of oxygen with ionizing radiation to a total radiation dose in the range of $1.20 \times 10^4$ roentgens to $2.32 \times 10^4$ roentgens at a temperature of from 50° C. to —15° C., while continuing said agitation, and (C) recovering the resulting high molecular weight polyvinyl acetate.

The present invention further consists in a process for preparing high viscosity polyvinyl alcohol by preparing polyvinyl acetate by the process set out above, deacetylating said polyvinyl acetate, and recovering said high viscosity polyvinyl alcohol.

The invention further consists in high molecular weight polyvinyl acetate having an intrinsic viscosity, when hydrolyzed and reacetylated, of 1.7 to 3.2 dl./g.

The invention further consists in high viscosity polyvinyl alcohol having a viscosity corresponding to an intrinsic viscosity of 1.7 to 3.2 dl./g. for its reacetylated polymer.

The vinyl acetate monomer used to carry out the present process should be purified to remove any objectionable impurity together with any polymerization inhibitor that may be present and the reaction should be carried out in absence of oxygen. Vinyl acetate can be purified by distillation. A simple way to check the purity of the monomer is by ultra-violet spectroscopy. Thus, on a U.V. spectrometer, at 265 m$\mu$, the maximum permissible absorption for satisfactory vinyl acetate is 0.5.

While polymerization temperatures of from +50° C. to —15° C. are within the operable range for the invention, temperatures from 0° C. up to 15° C. give exceptionally high conversions. If temperatures below 0° C. are used, a substance having the property of lowering the freezing point of water, for example methanol, should be added in appropriate quantity to prevent freezing of the aqueous phase of the emulsion.

The measure of the amount of irradiation is a roentgen unit (r.), which is defined as the amount of radiation that produces one electrostatic unit of charge per milliliter of dry air under standard conditions of temperature and pressure.

It was already known that with high radiation doses the polymerization of vinyl acetate had to be stopped at low conversions, e.g. around 25%, otherwise cross-linking of the polyvinyl acetate ocurred with subsequent degradation upon hydrolysis of the polymer to polyvinyl alcohol. It has now been found that conversions up to 85% and higher are possible when the polymerization is effected in aqueous emulsion at total irradiation doses equivalent to irradiation of 120 grams of emulsified vinyl acetate with from $1.20 \times 10^4$ to $2.32 \times 10^4$ roentgens.

Adequate proportions of monomer in the emulsion are from 30 to 60%, although quantities even lower than 30% are satisfactory. A preferred range is from 30 to 35% of monomer on the total emulsion.

The emulsifying agent required to form the emulsion must be a compound which is stable to radiation, as exemplified by stearamidopropyldimethyl - $\beta$ - hydroxyethyl ammonium dihydrogen phosphate, available commercially under the trademark Cationic SP. Other examples of radiation stable emulsifying materials are well known, e.g. from British Patent 819,451. The emulsifying agent, also called wetting agent, should be used in sufficient quantity to produce an emulsion under agitation. The proportion varies according to the percentage of monomer in the emulsion. A proportion of 0.1–5.0% of the total emulsion is satisfactory, while a proportion of 0.5% is preferred.

Polyvinyl acetate can be converted to polyvinyl alcohol for purposes of the present invention by any method capable of replacing the acetoxy group with a hydroxy group. Thus polyvinyl acetate can be deacetylated catalytically with acids or bases dissolved in water or lower alkanols, for example, solutions of sodium hydroxide in methanol. Bases are preferred however because acid hydrolysis can cause some coloration of the resin and is believed to cause some amount of degradation.

A general method of alcoholysis is to dissolve the polyvinyl acetate resin in methanol so as to obtain a 5-20% solution of the resin. A small quantity of NaOH or KOH in solution in methanol is added to this solution. The mixture is left standing at room temperature for several hours. After syneresis, the gel is formed. After syneresis, the gel is broken up, dried, and then washed in methanol to remove sodium acetate. The resultant polyvinyl alcohol is recovered.

Reacetylation is usually done by contacting the dry polyvinyl alcohol powder with pyridine and acetic anhydride, and heating the mixture at 100° C. until the powder is dissolved. Due to the very high molecular weight of the resins produced by the process of this invention, it was found that very long heating times were necessary in order to complete reacetylation. A more rapid method of acetylation was developed. This method consists in heating the polyvinyl alcohol gel, which contains some methanol, under vacuum in presence of pyridine and excess acetone until all the volatiles boiling below the boiling point of pyridine are evaporated. The resultant gel is heated with acetic anhydride in presence of pyridine. A clear solution is obtained within 30 minutes.

The following examples are typical of polyvinyl acetate and polyvinyl alcohol resins prepared according to the process of the present invention. They are intended to illustrate but not to limit the scope of the invention. Where intrinsic viscosities are given, they were obtained from viscosity measurements of acetone solutions on an Ostwald viscosimeter at 20±0.4° C. with a precision of ±0.1 dl./g.

*Example 1*

Vinyl acetate monomer was distilled to remove impurities and 120 g. of the purified monomer was placed in a one litre three-necked round bottom glass flask equipped with a glass stirrer, a thermometer, and inlet and outlet tubes for nitrogen gas. 278 g. of water and 2 g. of a 35% aqueous solution of stearamidopropyl-dimethyl-$\beta$-hydroxyethyl ammonium dihydrogen phosphate, sold commercially under the trademark Cationic SP, were added separately to the vinyl acetate monomer. The stirred reaction mixture was brought to 5° C. by a cooling bath while a stream of nitrogen was circulated through the flask for 15 minutes. At the end of this period, the temperature inside the flask had settled to 5° C. The nitrogen flow was reduced to an amount sufficient to maintain a positive pressure of nitrogen inside the flask during the reaction. The reaction mixture was then irradiated for 7 hours at this temperature by gamma radiation produced by a Co$^{60}$ source at a dose rate of 2900 r./hr. (total dose of $2.03 \times 10^4$ r.)

The resulting polyvinyl acetate emulsion was dried at 120° C. for about three hours. The dried resin thus obtained weighed 100 g. and was completely soluble in acetone. The yield, expressed as percent monomer conversion, was 83%. The resin had an intrinsic viscosity of 4.9 dl./g.

The polymer was hydrolyzed and reacetylated by the following method:

One gram of polymer was dissolved by shaking overnight at room temperature in 100 ml. of dry methanol. A solution of 0.1 g. KOH in 5 ml. methanol was added and the resulting mixture was left standing overnight. The gel produced was cut into small cubes, decanted from the liquid released by syneresis, and covered with 100 ml. of acetone and 400 ml. of pyridine. The gel mixture was evaporated under vacuum (20 mm. Hg) at 40° C. to a volume of about 30 ml.

To this mixture were added 20 ml. of dry pyridine and 20 ml. of acetic anhydride. A clear solution was obtained in about 20 minutes by heating to 90° C. After heating for three hours at 90° C., the solution was evaporated at a pressure of 20 mm. Hg. The polyvinyl acetate residue was dissolved in benzene (50 ml.), filtered, heated on a steam bath to remove most of the solvent, and finally dried at 120° C. for 2 hrs.

The reacetylated polyvinyl acetate resin had an intrinsic viscosity of 3.2 dl./g. This figure compares very favorably with an intrinsic viscosity of 1.6 dl./g., which is the highest figure obtained for chemically homogeneous reacetylated polyvinyl acetate obtained by prior art processes. By way of comparison, a 4% w./v. solution in water of the highest molecular weight polyvinyl alcohol commercially available, sold under the trademark Gelvatol 1:90, has a viscosity of 60 cps. at 20° C., while this same viscosity is obtained with only 2% w./v. aqueous solution of polyvinyl alcohol obtained by the present process. A 4% w./v. aqueous solution of polyvinyl alcohol obtained by the present process would have a viscosity, calculated by extrapolation, of 4,000 cps.

The polyvinyl alcohol produced by the present process also showed very high water resistance when compared to commercial polyvinyl alcohol. The water resistance was measured by making a wet bond test i.e. by measuring the ability of polyvinyl alcohol to maintain an adhesive bond when wetted.

*Examples 2 and 3*

Following the procedure used in Example 1 and the same proportions of reactants, high molecular weight polyvinyl acetate was produced by irradiating the reaction mixture with gamma radiation at a dose rate of 2,900 r./hr. for 6 hours (Ex. 2) and 8 hours (Ex. 3) respectively, at 5° C. The total dose of radiation was $1.74 \times 10^4$ r. for Ex. 2, and $2.32 \times 10^4$ r. for Ex. 3. Conversions of 25% for Ex. 2 and 83% for Ex. 3 were obtained.

The polymers obtained as aforesaid were hydrolyzed and reacetylated by the method for Example 1. The intrinsic viscosities of the original and reacetylated polymers, respectively, were as follows:

| Example | 2 | 3 |
|---|---|---|
| Intrinsic viscosity of original polyvinyl acetate (dl./g.) | 3.2 | 5.3 |
| Intrinsic viscosity of reacetylated polyvinyl acetate (dl./g.) | 3.1 | 2.2 |

As can be seen, the reacetylated polyvinyl acetates and the corresponding polyvinyl alcohols produced by the present process show a remarkable increase in viscosity over the products of prior art processes.

*Example 4*

Following the procedure used in Example 1 and the same quantities of reactants, high molecular weight polyvinyl acetate was produced by irradiating the reaction mixture with gamma radiation at a dose rate of 500 r./hr. for 24 hours at 5° C. (total dose of $1.20 \times 10^4$ r.). A conversion of 80% was obtained.

The polymer thus obtained was hydrolyzed and reacetylated by the method of Example 1. The reacetylated polymer had an intrinsic viscosity of 3.1 dl./g.

The results of this example show that, when using radiation doses that are within the scope of this invention, an equivalent total radiation amount will produce equivalent high viscosity polymer, regardless of the radiation dose rate.

While in the examples gamma radiation from a cobalt 60 source was employed and is preferred as the most practical, it will be understood that other sources of radiation, for example fission by-products, separated isotopes such as Cs$^{137}$, alpha, beta, or X-radiation, may also be used to initiate the polymerization.

The following illustration indicates the inadequacy of irradiation polymerization of vinyl acetate in bulk to produce polymers which give high viscosity solutions on hydrolysis and/or reacetylation.

100 cc. of vinyl acetate was placed in a glass bottle of capacity slightly higher than 100 cc. The monomer was at room temperature (about 25° C.). A stream of nitrogen was circulated through the monomer for 15 minutes to displace oxygen. At the end of this period, the nitrogen flow was reduced to an amount sufficient to maintain a positive pressure of nitrogen in the bottle during the reaction. The monomer was then bulk polymerized by irradiation at room temperature by gamma radiation produced by a $Co^{60}$ source at a dose rate of 700 r./hr. for two hours. At the end of this time, the temperature, which had risen gradually during the reaction period, had reached 40° C. The reaction was stopped by adding a small amount of hydroquinone inhibitor. The reaction mass was evaporated for two hours at 120° C. A solid residue of polymer product was thus obtained. The monomer conversion was 50%. A small quantity of this polymer product was dissolved in acetone and the viscosity measured. The intrinsic viscosity of the polymer was 2.8 dl./g. A sample of the polymer was hydrolyzed and reacetylated by the method described in Example 1. After reacetylation, the polymer had an intrinsic viscosity of 1.6 dl./g.

These resutls show the marked advantage of emulsion polymerization over bulk polymerization. The illustration also demonstrates that, for polyvinyl acetate produced at high conversions by bulk polymerization, degradation causes a marked decrease in the viscosity of the polymer upon hydrolysis or alcoholysis.

What is claimed is:

1. A process for preparing high molecular weight polyvinyl acetate, said process comprising (A) emulsifying by agitation a mixture consisting of vinyl acetate, water, and an emulsifying agent stable to ionizing radiation, (B) irradiating said emulsified vinyl acetate in absence of oxygen with ionizing radiation to a total radiation dose equivalent to irradiation of 120 grams of emulsified vinyl acetate with from $1.20 \times 10^4$ roentgens to $2.32 \times 10^4$ roentgens, at a temperature of from 50° C. to −15° C. while continuing said agitation, and (C) recovering the resulting high molecular weight polyvinyl acetate.

2. A process according to claim 1, in which said ionizing radiation is gamma radiation.

3. A process according to claim 2, in which said gamma radiation is emitted by $Co^{60}$.

4. A process according to claim 1, in which said emulsifying agent is stearamidopropyldimethyl-β-hydroxyethyl ammonium dihydrogen phosphate.

5. A process according to claim 1, in which the temperature is from 0° C. to 15° C.

6. A process for preparing high viscosity polyvinyl alcohol said process comprising (A) preparing high molecular weight polyvinyl acetate by (1) emulsifying by agitation a mixture consisting of vinyl acetate, water, and an emulsifying agent stable to ionizing radiation, (2) irradiating said emulsified vinyl acetate in absence of oxygen with ionizing radiation to a total radiation dose equivalent to irradiation of 120 grams of emulsified vinyl acetate with from $1.20 \times 10^4$ roentgens to $2.32 \times 10^4$ roentgens, at a temperature of from 50° C. to −15° C. while continuing said agitation, (3) recovering said high molecular weight polyvinyl acetate, (B) deacetylating said polyvinyl acetate, and (C) recovering said high viscosity polyvinyl alcohol.

7. A process according to claim 6, in which said deacetylation is accomplished by alkaline alcoholysis.

8. High molecular weight polyvinyl acetate having an intrinsic viscosity in acetone solution at 20° C., when hydrolyzed and reacetylated, of 1.7 to 3.2 dl./g., said polyvinyl acetate having been prepared by the process claimed in claim 1.

9. High viscosity polyvinyl alcohol having a viscosity of at least 60 cps. in a 2 percent weight per volume aqueous solution at 20° C., said polyvinyl alcohol having been prepared by the process claimed in claim 6.

10. A process for the production of a high viscosity polyvinyl alcohol having a viscosity of at least 60 cps. in a 2 percent weight per volume aqueous solution at 20° C. which comprises (1) deacetylating a high molecular weight polyvinyl acetate, said polyvinyl acetate having been prepared by (a) emulsifying by agitation a mixture consisting of vinyl acetate, water, and an emulsifying agent stable to ionizing radiation, and (b) irradiating said emulsified vinyl acetate in absence of oxygen with ionizing radiation to a total radiation dose equivalent to irradiation of 120 grams of emulsified vinyl acetate with from $1.20 \times 10^4$ roentgens to $2.32 \times 10^4$ roentgens, at a temperature of from 50° C. to −15° C. while continuing said agitation to produce a high molecular weight polyvinyl acetate, and (2) recovering the resulting high viscosity polyvinyl alcohol.

11. A process as claimed in claim 10, in which the deacetylation is accomplished by alkaline alcoholysis.

References Cited by the Examiner

UNITED STATES PATENTS

| 2,109,883 | 3/1938 | Herrmann et al. | 260—91.3 |
| 2,367,661 | 1/1945 | Agre | 204—158 |
| 2,897,127 | 8/1955 | Miller | 204—154 |
| 2,955,995 | 10/1960 | Black et al. | 204—154 |
| 3,096,267 | 7/1963 | Matsumoto et al. | 204—158 |

FOREIGN PATENTS

| 665,262 | 1/1952 | Great Britain. |

OTHER REFERENCES

Chapiro: "J. de Chemie Physique," vol. 47, pages 764–75 (1950), 204–154.

Hopwood et al.: "Nature," vol. 143, page 640, Apr. 15, 1939.

Martin: Chemical and Engineering News, Apr. 4, 1955.

Flory: Principles of Polymer Chemistry (only pp. 34–35 relied on), Cornell, 1953.

JOSEPH L. SCHOFER, *Primary Examiner.*

MILTON STERMAN, HAROLD N. BURSTEIN, WILLIAM H. SHORT, *Examiners.*

J. F. McNALLY, M. B. KURTZMAN,
*Assistant Examiners.*